United States Patent [19]

Nagasaka et al.

[11] Patent Number: 4,903,587
[45] Date of Patent: Feb. 27, 1990

[54] AUTOMATIC BAKING APPARATUS

[75] Inventors: Tosio Nagasaka, Kasukabe; Kyoichi Saito, Saitama, both of Japan

[73] Assignee: Hitachi Heating Appliances Co., Ltd., Kashiwa, Japan

[21] Appl. No.: 176,415

[22] Filed: Apr. 1, 1988

[30] Foreign Application Priority Data

Apr. 2, 1987 [JP] Japan .................. 62-82016
Apr. 2, 1987 [JP] Japan .................. 62-82017

[51] Int. Cl.⁴ ............................................ A47J 37/01
[52] U.S. Cl. ........................................ 99/325; 99/348; 99/352; 99/468; 126/21 A
[58] Field of Search ............... 99/325, 348, 352, 468, 99/474, 476; 366/99, 145, 146; 126/281, 21 A

[56] References Cited

U.S. PATENT DOCUMENTS

| | | | |
|---|---|---|---|
| 2,862,095 | 11/1958 | Scofield | 126/21 A |
| 4,097,722 | 6/1978 | Soler et al. | 219/370 X |
| 4,133,336 | 1/1979 | Smith | 126/21 A |
| 4,155,294 | 5/1979 | Langhammer et al. | 219/370 X |
| 4,294,166 | 10/1981 | Takeuchi | 99/348 |
| 4,538,509 | 9/1985 | Ojima et al. | 99/352 X |
| 4,550,693 | 11/1985 | Hedenberg | 99/348 |
| 4,593,179 | 6/1986 | Schulz et al. | 219/370 X |
| 4,693,610 | 9/1987 | Weiss | 366/146 |
| 4,762,057 | 8/1988 | Hirota et al. | 366/146 X |
| 4,776,265 | 10/1988 | Ojima | 99/468 |

FOREIGN PATENT DOCUMENTS 0087726 7/1981 Japan .................. 126/21 A

Primary Examiner—Stephen Marcus
Assistant Examiner—Christine A. Peterson
Attorney, Agent, or Firm—Antonelli, Terry & Wands

[57] ABSTRACT

An automatic baking apparatus comprises a kneading case doubling as a baking die mounted removably in a heating chamber, an inlet and an outlet formed in the side wall of the heating chamber, a fan casing having the inlet and the outlet, a fan arranged in opposed relationship to the inlet of an air passage formed by the side wall of the heating chamber and the fan casing, a fan heater formed by being bent in the vicinity of the outlet, a motor for driving the fan, a dough temperature sensor arranged downward of the kneading case, a room temperature sensor for detecting the room temperature, a lower heater arranged downward of the kneading case, a blade drive in the kneading case, a motor for driving the blade, and a microcomputer. In accordance with the temperatures detected by the dough temperature sensor and the room temperature sensor, the motors and heaters are driven thereby to bake up the dough into bread within a predetermined length of time.

15 Claims, 8 Drawing Sheets

PREHEATING → KNEADING → SUSPENSION → KNEADING → PRIMARY FERMENTATION → DEGASSING → FINISH FERMENTATION → BAKING (PRE-BAKING) → BAKING (FINISH-BAKING) → COOLING

FIG. 7

| PROCESS / ROOM TEMPERATURE ZONE | PRE-HEATING | KNEADING | SUSPENSION | KNEADING | PRIMARY FERMENTATION | DEGASSING | FINISH FERMENTATION | BAKING | | COOLING |
|---|---|---|---|---|---|---|---|---|---|---|
| | | | | | | | | PRE-BAKING | FINISH BAKING | |
| 16°C OR LESS | UP TO 20°C | 5 MIN | 5 MIN | 18 MIN | 50 MIN | 7 SECS | 80 MIN | 15 MIN | 35 MIN | ABT 22 MIN |
| 21°C ~ 25°C | — | 5 MIN | 5 MIN | 18 MIN | 50 MIN | 7 SECS | 80 MIN | 15 MIN | 35 MIN | ABT 22 MIN |
| 26°C ~ 32°C | — | 5 MIN | 5 MIN | 16 MIN | 50 MIN | 7 SECS | 75 MIN | 15 MIN | 35 MIN | ABT 29 MIN |
| 33°C OR MORE | — | 5 MIN | 5 MIN | 13 MIN | 50 MIN | 7 SECS | 70 MIN | 15 MIN | 40 MIN | ABT 32 MIN |

FIG. 9C $T_H$ : DOUGH TEMP. SENSOR INDICATION $T_R$ : ROOM TEMP. SENSOR INDICATION $T_1$ : 21°C (PREHEATING START TEMP.)

$T_2$ : 26°C $T_3$ : 33°C

RESIDUAL TIME : 3 HRS 50MIN FROM START

AUTOMATIC BAKING APPARATUS

BACKGROUND OF THE INVENTION

The present invention relates to a home automatic baking apparatus comprising heaters for holding the temperature of bread dough at fixed level and baking bread efficiently.

Figure 1:
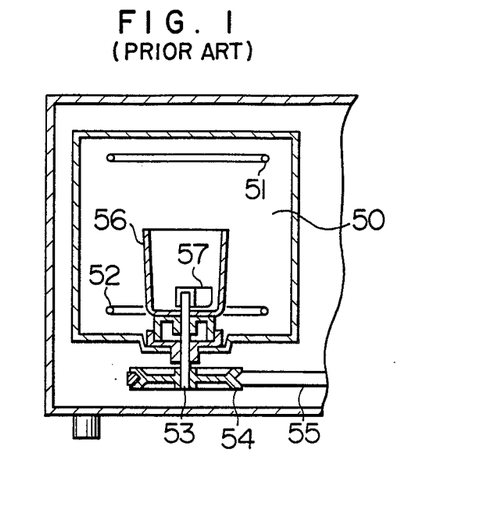
FIGS. 1 and 2 are sectional views schematically showing a configuration of a conventional semiautomatic baking apparatus and a hot air circulating type oven.
Figure 2:
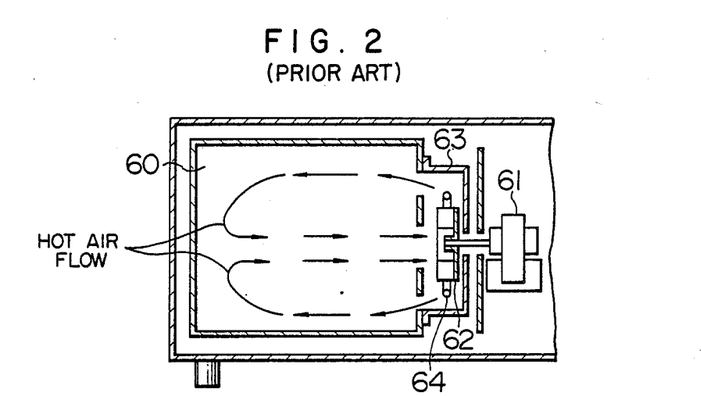

Conventional automatic baking apparatuses of this type include an electric oven, a semi-automatic bakery oven shown in FIG. 1 (JP-A-60-36729) or an oven of hot-air circulation type shown in FIG. 2 (JP-A-61-1290). The baking apparatus shown in FIG. 1 is composed of a heating chamber 50 built in a body case, an upper heater 51 arranged at an upper part in the heating chamber 50, a main motor (not shown) arranged within a casing 56 in the vicinity of the bottom, a belt 55 and a pulley (large) 54 through which a removable blade 57 is rotatable at the top of a shaft 53 vertically arranged through the bottom, and a kneading case 56 with a lower heater 52 arranged around the outer bottom section thereof. After the processes of kneading, primary fermentation and degassing in the kneading case 56, the kneading case 56 and the dough are taken out, and the dough is divided, rounded and subjected to bench time process, after which the dough is formed and placed in a baking die. A baking pan is arranged in the heating chamber, and the baking die is placed on it for the secondary fermentation and baking. Also, as soon as the dough is baked up, the baking die, together with the baking pan, is taken out, followed by the bread, which is then placed on metal netting or the like for natual cooling to a level equal to about human body temperature before being served. In this type of apparatus, a thermostat or the like temperature sensor means mounted on the side wall of the heating chamber is used to turn on and off a heater to adjust the temperature in the heating chamber to the yeast fermentation temperature or baking temperature.

The semi-automatic baking apparatus of this type, therefore, is always accompanied by manual work for intermediate processes after the materials are set, so that the user is required to attend it through the approximately four hours of baking processes. Further, the operation of upper and lower heaters by a thermostat or the like arranged on the side wall of the heating chamber does not permit the internal temperature of the heating chamber to be regulated in detailed manner, but the fermentation and baking conditions require constant visual check. Furthermore, the use of upper and lower heaters of oven type for baking causes temperature variations between various parts of the kneading case or the heating chamber interior, thereby unavoidably leading to the bread head being baked in abnormally excessive brown as compared with the kneading case interior at the cost of taste. The baking apparatus shown in FIG. 2, on the other hand, is configured of a heating chamber 60 built in a body case, a fan motor 61 mounted on the outer wall of the heater chamber 60, fan casing 63 with a fan 62 driven by the fan motor 61, and a fan heater 64 around the fan 62 in the fan casing 63.

In both of these conventional apparatuses, the heating chambers 50, 60 have a large volume so that if a comparatively small object placed at the central part of the heating chamber is to be heated, a heater of comparatively large capacity (800 W to 1 KW) is often used with deteriorated thermal efficiency on the one hand, and the body case is too bulky to fit a kitchen position snugly on the other. Another disadvantage of these apparatuses is encountered when a comparatively large object is heated. In the former apparatus, the part of the object near to the upper heater 51 is baked to an excessively degree, while the central part thereof is hard to bake and the sufficient baking thereof takes a considerable length of time. In the latter apparatus, on the other hand, hot air is circulated along the directions of the shown arrows, and the resulting insufficient air distribution leads to a disadvantage similar to that of the former apparatus.

Further, the conventional semi-automatic baking apparatus of this type shown in FIG. 1 is not equipped with any room temperature sensor, but comprises a kneading case mounted removably in the heating chamber and a blade removably mounted on an upper shaft protruded through the bottom of the kneading case, wherein the heater energization is controlled by a thermostat or the like arranged on the side wall of the heating chamber thereby to control the temperature in the heating chamber. The dough temperature, therefore, could not measured directly. Also, in this semiautomatic apparatus, after the processes of kneading, fermentation and degassing all of which are conducted in the kneading case, the kneading case and the dough are taken out, and through the processes of dividing, rounding and bench time, the dough is formed and placed on a baking pan for the secondary fermentation and baking. Some of these processes always require manual work.

According to this configuration, the dough temperature which is easily affected by external temperature is controlled by upper and lower heaters to maintain the dough at the fermentation temperature, together with a timer to adjust the control and kneading time.

Since the temperature of the heating room is controlled by thermostat only, the dough temperature cannot be controlled precisely. Nor is it possible to meet fine fluctuations according four seasons and room conditioner in room temperature. When the room temperature changes from 10° C. to 25° C., for instance, the fixed manner of operation of the heater and motor does not allow for the temperature to be kept at about 30° C. suitable for formentation, and the resulting overshoot of the heater raises the dough temperature to a level higher than 30° C. The dough is thus over-fermented, making it impossible to produce tasty bread. Further, the semiautomatic construction is always accompanied by manual work for some processes, and the user is required to attend the apparatus through the whole period of baking. Another disadvantage is that the oven-type baking causes temperature variations in the apparatus with the frequent result that the bread head rather than the kneading case interior is baked up in excessive color.

SUMMARY OF THE INVENTION

Accordingly, an object of the present invention, which has been devised to obviate the above-mentioned shortcomings, is to provide an automatic baking apparatus comprising a lower heater arranged at the bottom of a heating chamber, a fan casing with an outlet formed at the upper part on the side of the heating chamber, and a fan heater arranged first in U form, then substantially in Z form in the vicinity of the outlet in the fan casing and set to a capacity of 200 W to 400 W.

A fan driven by a fan motor installed in the neighbourhood of a fan casing is used to supply air to the outlet side and into the heating chamber. The temperature in the heating chamber is controlled by this circulation system.

Further, a dough temperature sensor is provided in pressure contact with the outside of the kneading case, which sensor is adapted to detect the dough temperature directly. The resulting direct measurement of the dough, fermentation and baking temperatures permits detailed control of the fan heater, upper and lower heaters and main motor.

According to the present invention, there is provided an automatic baking apparatus in which the bread dough placed in a baking die doubling as kneading case is efficiently fermented and baked within a small heating chamber on the one hand, and efficient heating is made possible within a short length of time with small power consumption on the other, thus providing a compact body case.

Another object of the present invention is to provide an automatic baking apparatus comprising a room temperature sensor arranged in the vicinity of the body case least affected thermally, whereby subtle changes in the chamber are detected thereby to control the heaters and motors suitably in manner for automatic operation.

According to another aspect of the present invention, there is provided an automatic baking apparatus wherein in the case where a timer is set, the room temperature is detected by the room temperature sensor to determine a start time. After starting the operation, the temperature of the bottom of the kneading case is detected by the dough temperature sensor, and if the bottom temperature is lower than 15° C., a preheating process is started thereby to turn on the lower heater. When the temperature rises above 16° C., the kneading process starts while at the same time energizing the fan motor and fan heater, so that hot air is circulated to raise the dough temperature up to 30° C. while kneading the dough. In the process, the room temperature, which is liable to affect the dough temperature, is kept detected by the room temperature sensor. If the room temperature changes from 10° C. to 25° C., for instance, a room temperature, if any, shifts into a sequence from 26° C. to 32° C., for instance, to shorten the kneading time, thus keeping the dough temperature at 30° C. In similar manner, if the temperature is higher than 30° C., the kneading alone raises the dough temperature up to about 35° C., and therefore the heater is not turned on, but only the fan motor is driven to cool the dough in a cold air. In this case, mere deprivation of the heat of vaporization does not lower the dough temperature to lower than 30° C. The kneading time, therefore, is further reduced to dampen an excessive fermentation, thereby keeping the baked bread substantially uniform in quality. In the fermentation process, as in the kneading process, the room temperature is detected for early reaction to keep the dough temperature at 30° C. or the fermentation time is shortened. In this way, a room temperature that may occur is quickly compensated for to maintain the dough temperature at 30° C. or the kneading time or fermentation time shortened to assure a fixed quality of the baked bread.

As described above, according to the present invention, a room temperature is used to detect subtle changes of room temperature in summer or winter, so that not only the dough temperature but also the heaters and motors are controlled by microcomputer in detailed manner thereby to bake the bread within a predetermined length of time.

DESCRIPTION OF THE PREFERRED EMBODIMENTS

An embodiment of the present invention will be explained with reference to the accompanying drawings.

Figure 3:
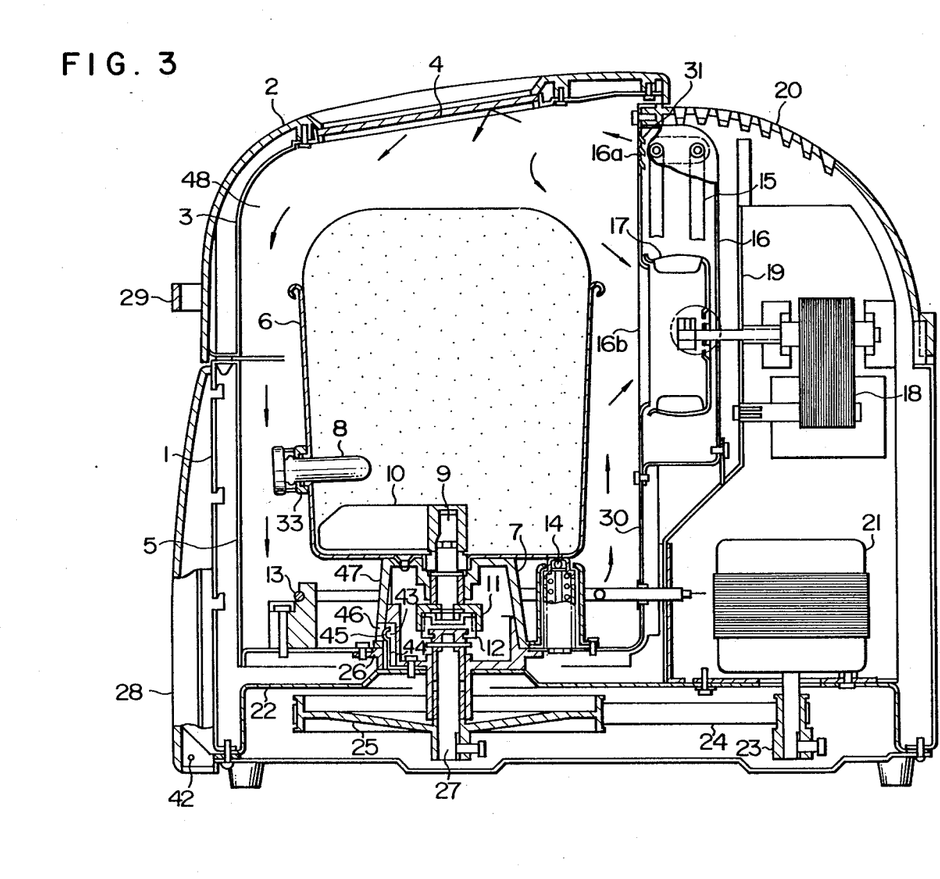
FIG. 3 is a sectional view schematically showing a configuration of an automatic baking apparatus according to an embodiment of the present invention.
Figure 4:
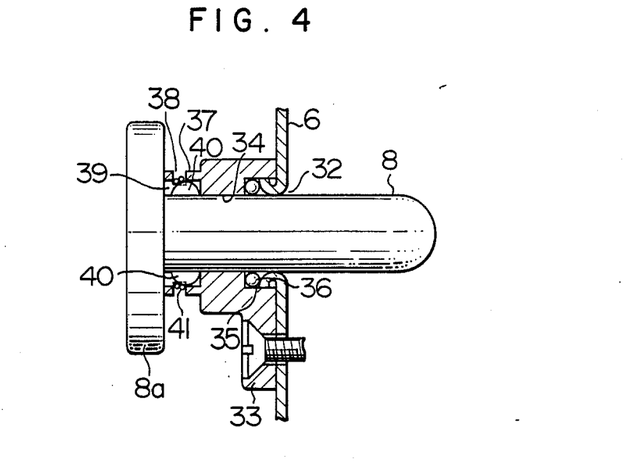
FIG. 4 is a sectional view showing a construction of an entangling bar and a fixing construction according to the same embodiment.
Figure 5:
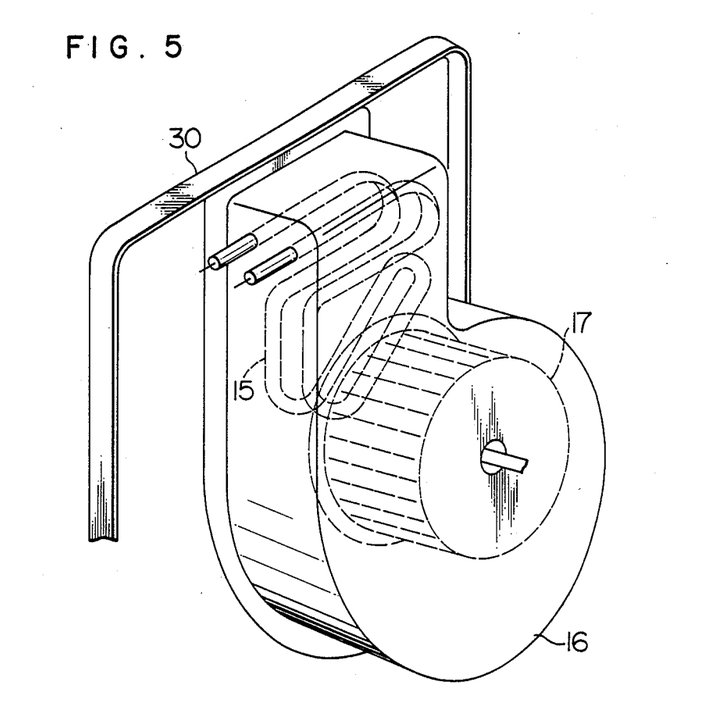
FIG. 5 is a perspective view schematically showing a configuration of a fan heater and a fan.

A configuration of the embodiment is showing in FIGS. 3, 4 and 5.

In FIGS. 3, 4 and 5, reference numeral 1 designates a body case, numeral 2 an outer cover arranged at the upper part on the front of the body case, and numeral 3 an inner cover arranged at the upper part on the front of a middle case 5 described later in the body case 1. Numeral 4 designates a transparent glass window fixed held between the outer cover 2 and the inner cover 3. Numeral 5 designates a middle case mounted in the body case 1, which together with the inner cover 3 makes up a heating chamber 48. Numeral 6 designates a kneading case removably disposed on a base 26 fixed at the internal center of the middle case 5. A case rest 7 is fixed at the external bottom center portion of the kneading case 6. An aperture 32 curling outside is formed on the outside of the side wall of the kneading case 6. Numeral 8 designates an entangling bar mounted removably through the aperture 32 of the kneading case 6 and having a protrusion 40 in the vicinity of a flange 8a formed at the bar end. Numeral 9 designates an upper shaft mounted rotatably on the case rest 7 and projected through the bottom of the kneading case 6 into the kneading case 6. Numeral 10 designates a blade fitted removably at the upper end of the upper shaft 9. Numeral 11 designates an upper coupling fixed at the lower end of the upper shaft 9 in fitted removable coupling with a lower coupling 12 fixed at the upper end of a lower shaft 27 mounted rotatably on a rest 26 at the bottom of the inner case 5. Numeral 13 designates a lower heater including a sheath heater with about 200 mm in diameter fixed between the bottom of the kneading case 6 and the bottom of the middle case 5, which diameter is slightly larger than that of the bottom of the kneading case 6. Numeral 14 designates a dough temperature sensor adapted to be energized by a spring (not shown) from the bottom of the middle case 5 into pressed contact with the outer bottom of the kneading case 6. Numeral 15 designates a fan heater arranged outside of the side wall 30 on the back of the middle case 5, which heater comprises a sheath heater of about 300 W bent in continuous U shape and then bent into substantially Z shape as shown in FIG. 5. This process of bending into U shape followed by bending into Z shape is comparatively easy in production and leads to a compact form, thus making it possible to construct a compact hot-air generating unit.

The use of both the lower heater and the fan heater at the same time permits the baking of bread in uniform color preventing the bread head from being thickened in color.

Also, by setting the fan heater capacity to 200 to 400 W and the lower heater to about 240 W, it is possible to bake the whole bread in uniform color. Numeral 16 designates a fan casing and numeral 17 a fan. The fan casing 16, which has the fan heater 15 and the fan 17 arranged therein, is mounted on the outside of the side wall 30 on the back of the middle case 5. An air passage is formed by being defined by the fan casing 16 and the side wall 30 on the back of the middle case 5. The fan heater 15 is arranged in the vicinity of an outlet 16a formed in the rear side wall 30, and the fan 17 is mounted in correspondence with an intake port 16b formed in the rear side wall 30. Numeral 18 designates a fan motor fixedly mounted on the back of the fan casing 16, which fan motor 18 has an axial thereof fixedly carrying the fan 17. Numeral 19 designates a shield plate interposed between the fan casing 16 and the fan motor 18. Numeral 20 designates a rear cover mounted at the upper part on the back of the body case 1. Numeral 21 designates a main motor arranged on a chassis 22 forming the bottom of the body case 1. The turning effort of the main motor 21 is transmitted through a small pulley 23, a belt 24, and a large pulley 25 to the lower shaft 27 arranged vertically through the chassis 22, and further to the blade 10. Numeral 28 designates an operating panel carrying switches and the like (not shown). Numeral 29 designates a handle arranged integrally with the outer cover 2. Numeral 31 designates a rectification plate slanted upward diagonally on the outlet 16a. There are a plurality of such rectification plates provided. Numeral 33 designates a bracket fixed outside of the aperture 32 of the side wall of the kneading case 6. Numeral 34 designates a through hole formed in the bracket 33 concentrically with the aperture 32 of the side wall of the kneading case 6. Numeral 35 designates an O-ring recess formed in the side wall of the kneading case 6 formed in the bracket 33 concentrically with the through hole 34. Numeral 36 designates an O-ring inserted into the O-ring recess 35. The inner diameter of the O-ring 36 is equal to or slightly smaller than the outer diameter of the entangling bar 8. The outer diameter of the O-ring recess 35 is equal to or slightly smaller than the outer diameter of the O-ring 36. The depth of the O-ring recess 35 is equal to or slightly larger than the width of the O-ring 36 mounted on the case. The peripheral cylindrical portion 37 of the bracket 33 is formed with a peripheral slit 36 concentric with the through hole 34. Numeral 39 designates a key slot formed to reach the peripheral slot 38 from the edge of the peripheral cylindrical portion 37. A peep hole 49 is formed in the peripheral cylindrical portion 37 and the through hole 34 at the intersection between the slot 39 and the peripheral slot 38. Numeral 41 designates a ring spring engaging the peripheral slot 38. A part of the ring spring 41 falls into the hole to stop the protrusion 40 of the entangling bar 8 that has passed through the peep hole 49. Numeral 42 designates a room temperature sensor arranged at a point affected by the least temperature changes at the lower end of the operating panel 28. Numeral 43 designates a recess formed in the rest 26. Numeral 44 designates a spring plate fixedly inserted into the recess 43. Numeral 45 designates the forward end of the spring plate 44, and numeral 46 an aperture formed in the side wall in the vicinity of the bottom of the case rest 7. The forward end 45 of the spring plate 44 is adapted to engage the aperture 46 through the aperture 47 formed by the aperture 46 and the recess 43 faced thereby and is fixed on the rest 26 of the kneading case 6.

Now, the operation of the present embodiment configured as above will be explained.

First, a cover lock (not shown) is released to open the outer cover 2, and the blade 10 is fitted at the upper end of the upper shaft 9 in the kneading case 6 taken out of the body case 1. The forward end of the entangling bar 8 is inserted through the through hole 34 of the bracket 33, O-ring 36, and the aperture 32 in the side wall of the kneading case 6, and the protrusion 40 pushed along the slot 39. The ring spring 41 falling partly into the peep hole 49 is expanded by the protrusion 40. Further insertion restores the ring spring 41 to position into fixed engagement with the protrusion 40. As a result, the forward end of the entangling bar 8 is securely fitted projected into the kneading case 6. In the next process, materials (flour, yeast, salt, sugar, skim milk, butter, water, etc.) required for baking are put into the kneading case 6, and the case rest 7 mounted on the bottom of the kneading case 6 is fixedly fitted on the rest 26. The forward end 45 of the spring plate 44 fixedly inserted in a plurality of recesses 43 of the rest 26 engages the aperture 46 of the case rest 7 through the aperture 47, thereby securely fixing the kneading case 6 on the rest 26. In the process, the upper coupling 11 is coupled with the lower coupling 12.

The outer cover 2 is then closed, and upon turning on the switch of the operating panel 28, the dough temperature sensor 14 in pressure contact with the bottom of the kneading case 6 detects the dough temperature indirectly. If the temperature thus detected is lower than 15° C., the lower heater 13 is switched on by control of the microcomputer (not shown). When the detection temperature exceeds 16° C., the main motor 21 is started. The power of the main motor 21 is transmitted through the small pulley 23, belt 24, and large pulley 25 to the lower shaft 27, and further to the lower coupling 12, upper coupling 11, upper shaft 9 and the blade 10 thereby to drive the blade 10. As a result, the material loaded in the kneading case 6 is stirred to knead up the dough between the blade 10 and the entangling bar 8 steadily. In the process, the energization of the lower heater 13 and the fan heater 15 and the operation of the fan motor 18 and the main motor 21 are controlled by the microcomputer to keep the dough temperature at 30° C. at the end of kneading. At the same time, the room temperature is detected by the room temperature sensor 42 to regulate the kneading time. If the room temperature is low, the kneading time is lengthened, and vice versa. Specifically, as is apparent from FIG. 7, the required time for each of kneading, finish fermentation, baking and cooling is subtly adjusted, in accordance with four temperature zones (below 20° C., 21°–25° C., 26°–32° C., and above 33° C.). This adjustment is precisely controlled in response to the room temperature by an electronic control circuit including a microcomputer described later to keep the dough temperature at 30° C. Also, if the room temperature is higher than 25° C., the dough temperature is increased to higher than 30° C. merely by the kneading process, in which case the heater is not switched on but the fan motor 18 only, so that the fan 17 blows air to cool the dough by heat of vaporization to keep at 30° C. If the room temperature rises beyond 30° C., however, the temperature increase by kneading is larger than the temperature decrease by cooling, resulting in a temperature higher than 30° C. Therefore, the kneading time is reduced to prevent excessive fermentation of the dough.

In the next primary fermentation process, the lower heater 13 is turned on and off by microcomputer control to keep the dough temperature at 30° C. In this fermentation process, neither the fan motor 18 nor the fan heater 15 is turned to prevent the dough from drying. In this process, as in the kneading process, the room temperature is detected so that if the temperature exceeds 30° C., the fermentation time is shortened.

In the next degassing process, the main motor 21 is driven for several seconds to drive the blade 10. As a result, the dough that has thus far risen with a gas (carbon dioxide) generated from yeast is kneaded in the same manner as in the kneading process and is degassed by being crushed.

In the next finish fermentation process, as in the primary fermentation, the operation is controlled by microcomputer.

As a result of the finish fermentation, the dough rises or expands up above the top edge of the kneading case 6, followed by the next baking process.

In the baking process, the insufficient baking of the bread surface in the kneading case 6 is compensated for on the one hand and the dough is let rise further, in the manner that the top of the bread is expanded over the topmost edge of the case 6, by turning on the lower heater 13 for about 15 minutes first of all. Then, the fan motor 18 and the fan heater 15 are switched on to conduct the main baking process for 30 minutes. When the temperature of 180° C. is detected by the dough sensor, the whole bread head is baked up light brown uniformly. In view of the fact that the fan heater 15 is fixedly mounted at the outlet 16a in the air passage formed between the back side wall 30 of the middle case 5 and the fan casing 16, less heat is released into ambience, thereby permitting efficient supply of warm and hot air into the middle case 5. In this way, heat is effectively applied to the dough and bread in the kneading case 6. The warm or hot air after being applied to the bread is absorbed into the inlet 16b from the fan 17, and the thermal effect on the fan motor 18 is thus reduced for highly efficient circulation of the warm or hot air. The outlet 16a has a plurality of deflection plates 31 arranged diagonally upward, so that the hot air blown out of the outlet 16a is applied on the upper inner cover 3, which air is reflected to be blown on the whole bread head, thus baking it light brown uniformly. Also, since the temperature of the heating chamber 48 is kept uniform by the hot-air circulation system, the dough part in the kneading case 6 is also baked up beautifully within a short length of time.

As soon as the bread is baked up, the fan heater 15 and lower heater 13 are, deenergized and the fan motor 18 is remains powered to drive the fan 17 for cooling the dough for 30 minutes while at the same time providing a signal to indicate the end of baking. The bread is thus cooled down to about 40° C. After that, the outer cover 2 is opened, the whole kneading case 6 is taken out of the middle case 5, the entangling bar 8 is pulled off, the kneading case 6 is turned upside down, and the bread and the kneading case 6 are taken out. In the process, there is no need to use a dish towel or to take out the bread and the kneading case 6, which are sufficiently cooled. Also, the bread, which is cooled down to a temperature convenient to eat, can be served immediately by removing the blade 10 embedded in the bottom thereof. The blade, which is also sufficiently cool, can be taken out by hand. In this way, the whole of the small heating room 48 is heated rapidly by the hot air applied overall from the upper part thereof in the heating chamber 48, a very efficient heating is effected within a short length of time with low power consumption. As a consequence, the body case 1 is constructed in compact manner to permit location even in a small kitchen.

In the aforementioned embodiment, the sensor 14 and the entangling bar 8 are arranged in opposed relations with each other in FIG. 3, and therefore it is desirable to set the entangling bar 8 direct above the sensor 14 in view of the tendency of the dough kneaded up to concentrate on the side of the entangling bar 8, with the result that the dough always exists upward of the sensor 14.

It is desirable to interpose a heat-resistant material between the outer cover 2 and the glass window 4 in order to protect the outer cover 2 which is made of a plastic material from high temperatures.

In the baking process, only the lower heater 13 is energized as a first step, and after the temperature detected by the sensor 14 reaches about 80° C., the hot air fan heater 15 is turned on as a second step to start the main baking process.

A radiant-heat reflective coating applied on the interior surface of the glass window 4 obviates the disadvantage that the bread head might otherwise be whitened without being heated sufficiently.

The intake port 16b, if arranged directly under the outlet 16a, would fail to attain uniform heating with hot air because the hot air is outputted obliquely due to the influence of the fan 17 and the fan casing 16, thereby making the baking condition non-uniform. Therefore, in order to improve the above defect, the positions of the outlet 16a and the intake port 16b should desirably be displaced slightly from each other in vertical relationship.

Also, the dough temperature sensor 14 should be mounted preferably on the inside but not outside of the lower heater 13 to reduce the effect of external temperature on the sensor, thereby permitting accurate detection of the dough temperature.

Figure 6:
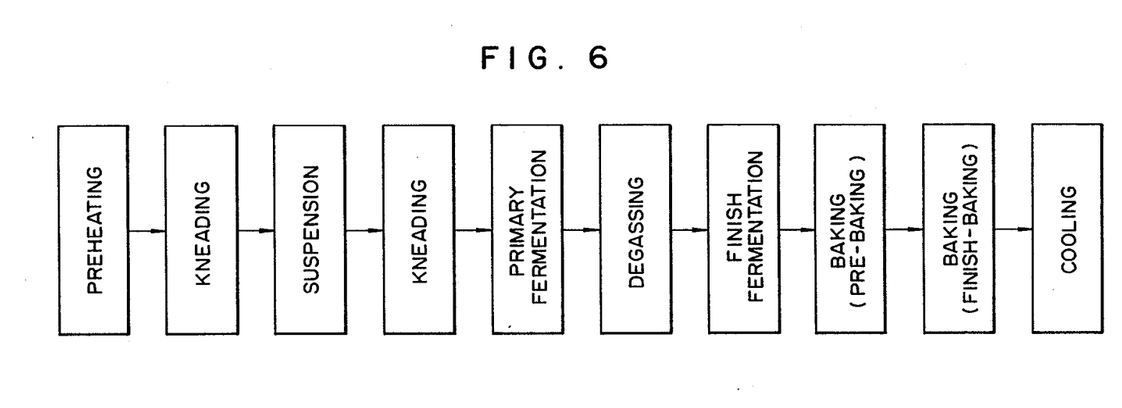
FIG. 6 is a block diagram showing an embodiment of the processes from preheating to cooling.

FIG. 6 shows a series of bread baking processes from the preheating of the bread dough to the cooling of baked-up bread. The time of the plurality of processes are adjusted in response to the room temperature as shown in FIG. 7 by microcomputer, in such a manner that the required time before baking up the bread is kept may be kept constant regardless of the room temperature for the operating convenience of the users.

As shown in FIG. 6, a suspension stop inserted in two kneading processes to improve the hydration between protein and water, thereby leading to the advantage that the yeast is uniformly mixed with the gluten structure to let bread rise or expand uniformly, by carbon dioxide generated by the yeast.

Figure 8:
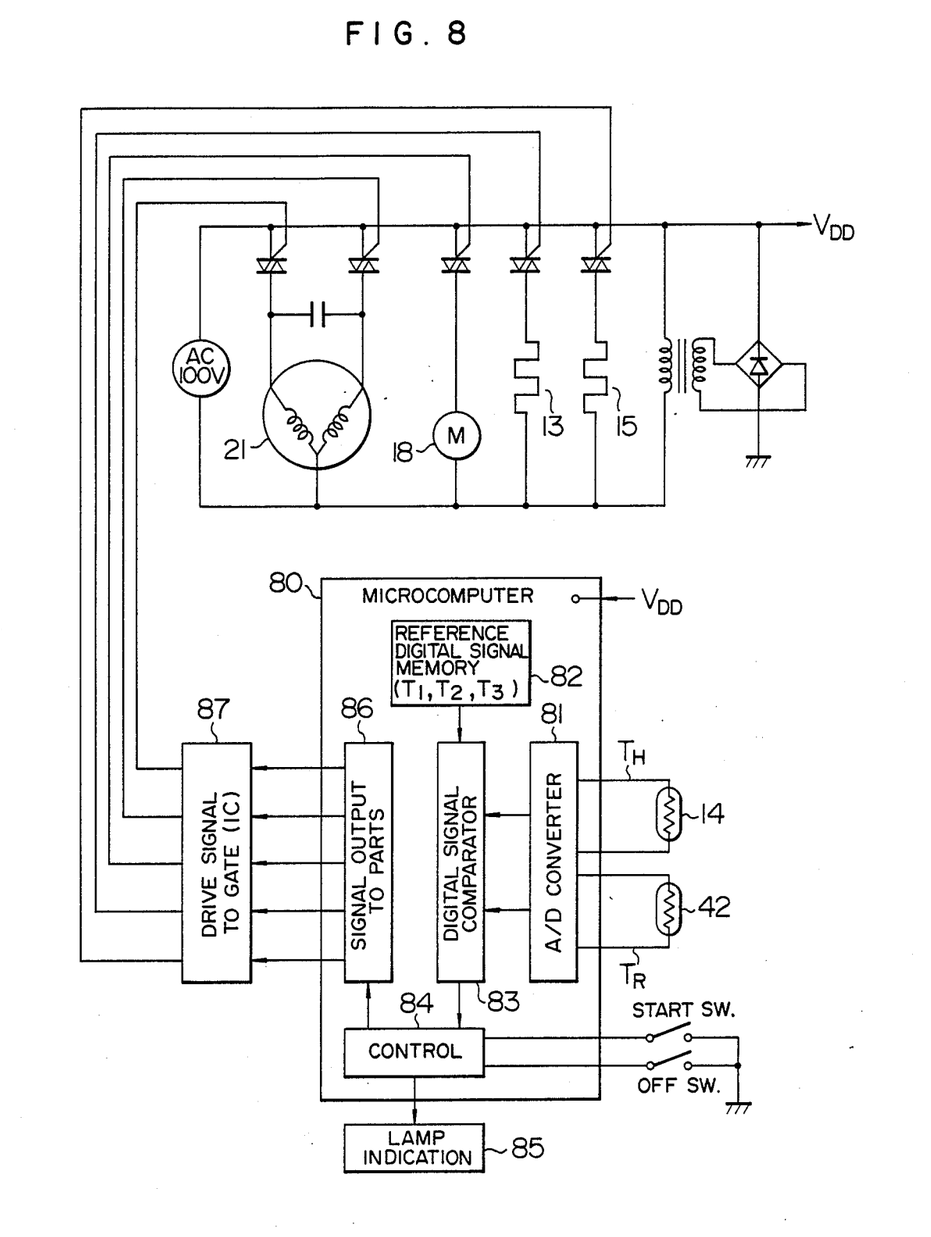
FIG. 8 is a block diagram showing an electrical control system for an automatic baking apparatus according to the present invention.
Figure 9A:
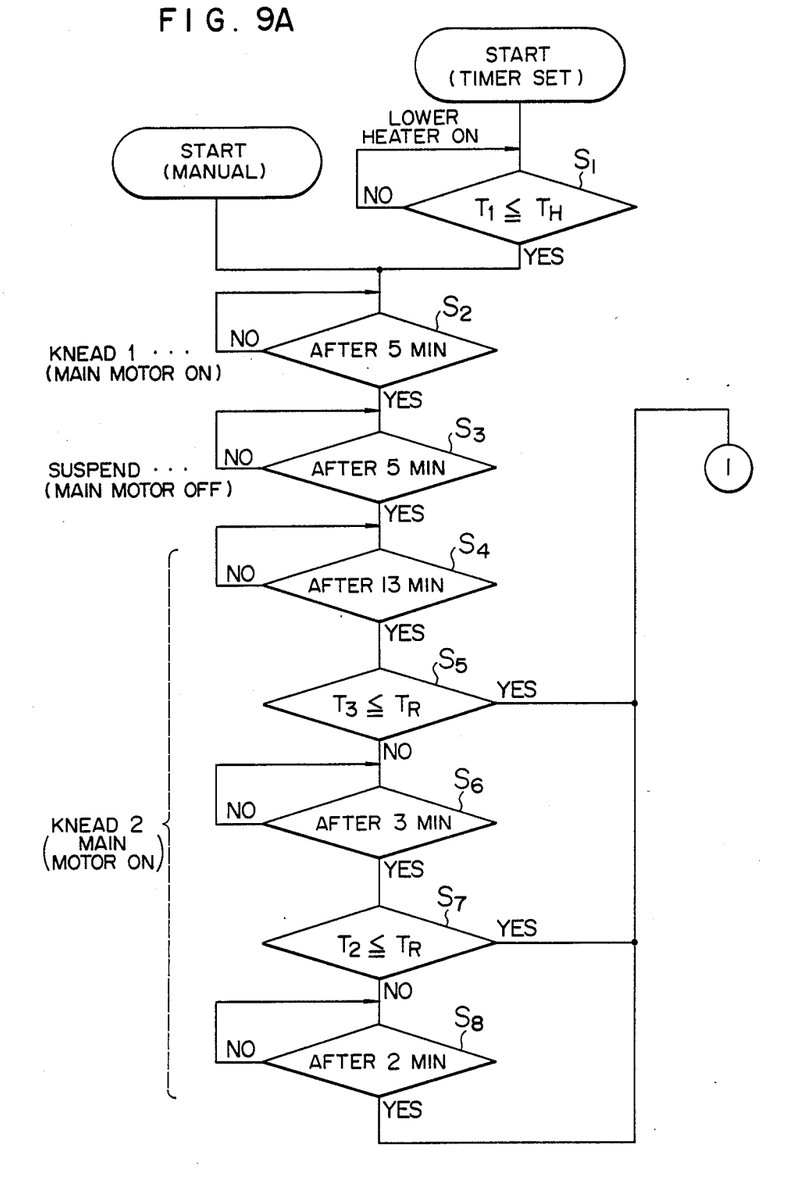
FIG. 9 is a flowchart showing the operation of the processes in FIG. 7.
Figure 9B:
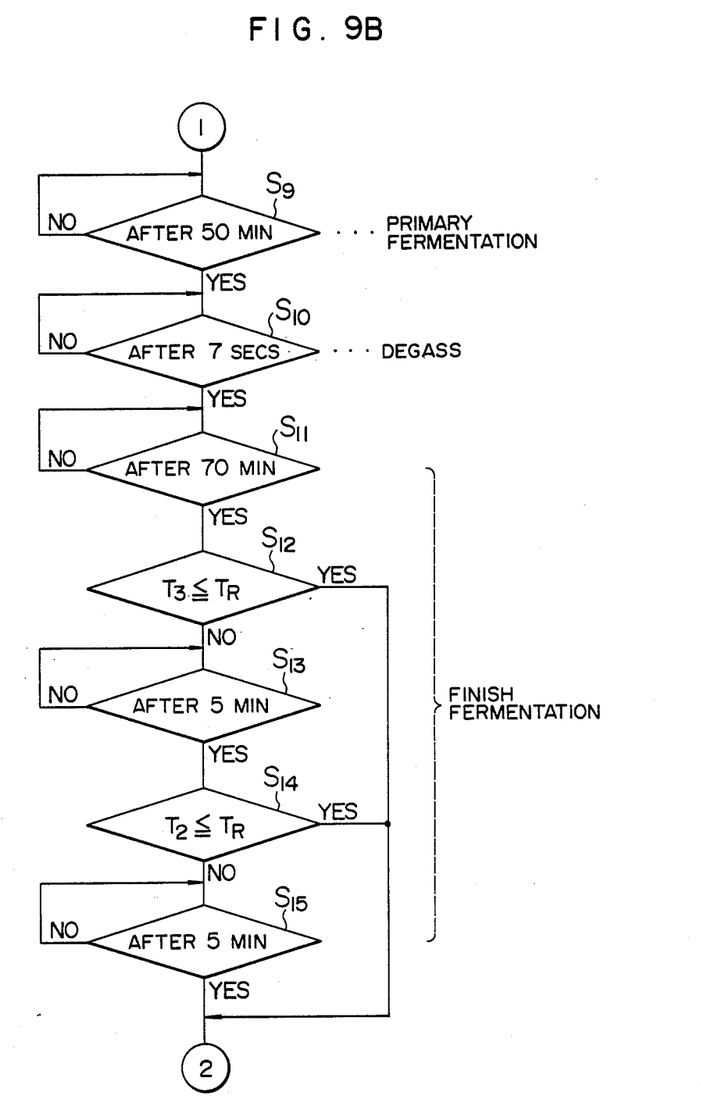
Figure 9C:
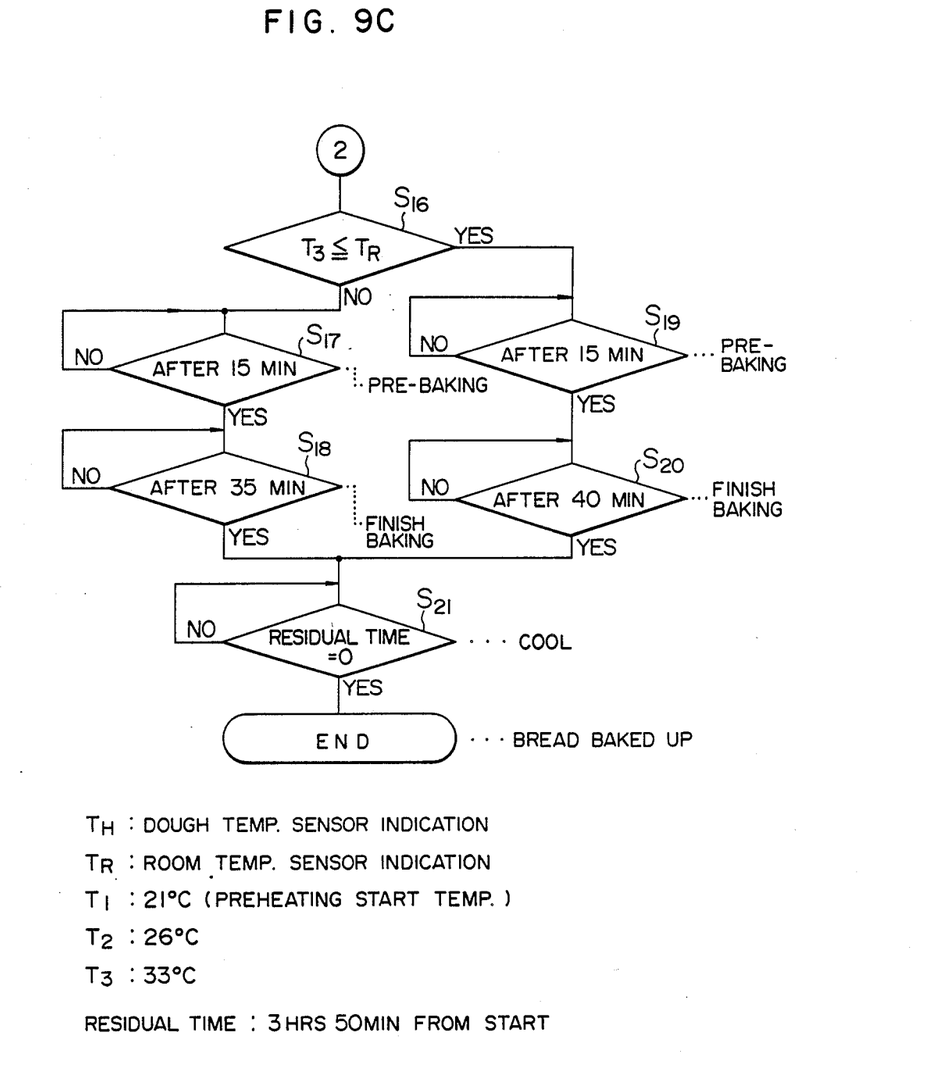

FIG. 8 shows a general configuration of a system for controlling the motor 18, the lower heater 13 and the fan heater 15 electronically by microcomputer on the basis of the temperature data produced from the dough temperature sensor 14 and the room temperature sensor 42, and FIG. 9 a flowchart of the control operation.

Figure 7:
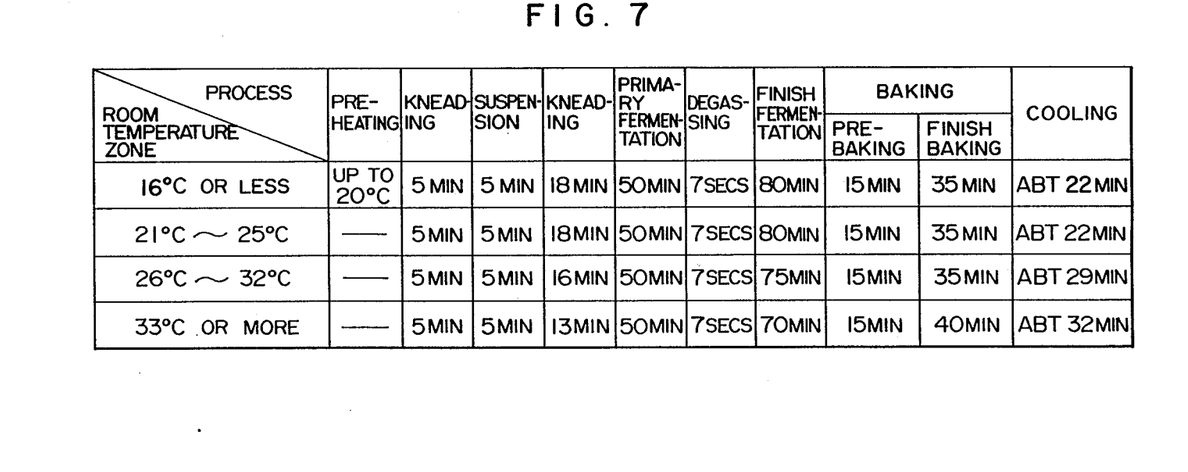
FIG. 7 is a table showing the required time corresponding to the room temperature range of each process shown in FIG. 6.

In FIG. 8, outputs of the sensors 14, 42 are applied to an A/D converter 81, and set temperatures T1, T2 and T3 from a reference digital signal memory 82 are compared in a digital signal comparator 83, the output of which is applied to a control section 84 and is controlled in accordance with the processing sequence of FIG. 7 in the manner shown in the flowchart of FIG. 9. A lamp indicator 85 indicates by lamp which of the processes is going on under the control of the control section 84. A control signal from the control section 84 is applied through a signal output section 86 connected with each port and a drive section 87 to the motors 21, 18, and heaters 13 and 15 which are thus controlled through respective triacs through the gate controlling signals from the drive section 87.

The flowchart of FIG. 9 is for executing the processes shown in the table of FIG. 7. In accordance with the room temperature zones, such processes as kneading, finish fermentation, bake-up and cooling are changed in the manner shown in the table of FIG. 7. Characters $T_R$ designates a room temperature, and $T_1$, $T_2$, $T_3$ reference temperature stored in the memory 82 which are, for example, 21° C., 26° C. and 33° C. respectively. The residual time is defined as the time remaining before a predetermined time (say, 3 hours and 50 minutes) is consumed from the operation start. In other words, when the residual time becomes zero, it indicates that the predetermined time has passed. According to this flowchart, a system for finishing the bread within a fixed length of time regardless of the room temperature is executed.

If the temperature $T_H$ detected by the dough temperature sensor at step S1 is lower than 21° C., for instance, the dough is preheated by the lower heater 13 at least until $T_H$ reaches 21° C. If the room temperature $T_R$ is equal to or higher than 33° C. at step S4, on the other hand, the secondary kneading process is ended in 13 minutes and the process proceeds to the fermentation at step S9. In the case where the temperature $T_R$ is between 33° C. and 26° C. (step S6), however, the secondary kneading process continues for 16 (=13+3) minutes. Similar control is also effected by steps 11, 13 and 15 for finish fermentation.

As described above, it is possible to bake up the bread within a predetermined length of time in correspondence to the room temperature $T_R$ under the control of the microcomputer 80.

It will thus be understood from the foregoing description that according to the present invention, an air passage is formed in the rear side wall of the middle case thereby to take in air from the central part of the air passage, which air is applied to a fan heater of a comparatively low power consumption disposed in proximity to the outlet, so that even a small heating room is subjected in whole to hot air supplied from above thereby to heat the whole heating room rapidly efficiently within a short length of time with low power consumption. At the same time, the whole body is rendered compact, thereby making it possible to locate the apparatus even in a small kitchen.

Further, according to the present invention, with a room sensor disposed under the operating panel subjected to the least temperature change in the body case, rapid action is taken against any changes in room temperature detected (such as by heating or cooling of the surrounding room), thereby keeping the dough temperature at 30° C., or alternatively, the kneading time or fermentation time is shortened to prevent excessive fermentation which otherwise might be caused by a temperature rise, thus producing a quality bread fixed in workmanship.

We claim:

1. An automatic baking apparatus having an exterior wall surrounding a heating chamber comprising:
   a kneading case doubling as a baking die removably mounted in said heating chamber;
   an air inlet and an air outlet formed in a side wall of the heating chamber;
   a fan casing connected with the inlet and the outlet which is disposed along a side wall on the outside of said chamber;
   a fan mounted in said fan casing for causing air to flow from said chamber outlet to said chamber inlet;
   a heating element in the fan casing between the fan and the air inlet to said heating chamber;
   a first motor for driving the fan;
   a dough temperature sensor arranged to detect the temperature of a lower portion of the kneading case;
   a room temperature sensor mounted in said exterior wall for detecting room temperature independently of the dough temperature at all times during operation of said baking apparatus;
   a lower heating element arranged below the kneading case;
   a blade driven within the kneading case;
   a second motor for driving the blade; and
   a microcomputer including means for controlling the time of operation of said motors and said heaters in accordance with the temperature detected by the dough temperature sensor and by the room temperature sensor to thereby vary the duration of kneading, fermentation, baking and cooling steps, said microcomputer being effective to complete the baking process with uniform product quality within a constant length of time.

2. An automatic baking apparatus according to claim 1, wherein said fan heater is formed by being bent to have a continuous U shape and by being bent also to have a Z-shape and a compact size that is fitted into said fan casing in the vicinity of said outlet.

3. An automatic baking apparatus according to claim 1, wherein the power capacity of the fan heat is in the range of 200 W to 400 W and the temperature of air exhausted from said outlet is in the range of about 200° C. to 300° C.

4. An automatic baking apparatus according to claim 1, further comprising an entangling bar inserted into said kneading case for kneading the dough in said kneading case.

5. An automatic baking apparatus according to claim 4, wherein said entangling bar includes a base protrusion and a flange, and said kneading case includes an annular spring for holding the protrusion, and further there is provided an O ring 36 between said kneading case and the bracket thereby providing water-tight condition upon insertion of the entangling bar.

6. An automatic baking apparatus according to claim 1, further comprising a lower heater at the lower part of the heating chamber downward of said kneading case, wherein said dough in said kneading case placed in said heating chamber is baked by the heat generated from said lower heater and the hot air supplied from said fan heater.

7. An automatic baking apparatus according to claim 6, wherein the power capacity of the lower heater is approximately 200-400 W.

8. An automatic baking apparatus according to claim 6, wherein only the lower heater is energized but not the fan heater when the dough is fermented.

9. An automatic baking apparatus according to claim 4, further comprising a dough temperature sensor arranged in contact with the lower outer part of the kneading case, said entangling bar being arranged upward of the dough temperature sensor.

10. An automatic baking apparatus according to claim 9, wherein the dough temperature sensor is arranged within the lower heater downward of the kneading case at the lower part of the heating chamber.

11. An automatic baking apparatus according to claim 1, wherein the hot air from the outlet is released upward by deflection surfaces arranged diagonally at the outlet.

12. An automatic baking apparatus according to claim 1, wherein the outlet is positioned not at the center portion of the apparatus but slightly displaced relative to the inlet.

13. An automatic baking apparatus as defined in claim 1 wherein said heater comprises a rigid metal heating element having a continuous U-shape that is bent also into a Z-shape to have a compact form and installed in the fan duct downstream of the fan and in the vicinity of the heating chamber outlet.

14. An automatic baking apparatus according to claim 13 wherein air from the fan casing is directed obliquely toward a cover surface of said apparatus and deflected downwardly to an upper surface of bread in said baking die to provide proper browning of the bread upper surface as the temperature sensed by said dough sensor reaches a predetermined high temperature.

15. An automatic baking apparatus as defined in claim 1 wherein air from the fan casing is directed obliquely toward a cover surface of said apparatus and deflected downwardly to an upper surface of bread in said baking die to provide proper browning of the bread upper surface as the temperature sensed by said dough sensor reaches a predetermined high temperature.

* * * * *